3,271,481
2,6-DISUBSTITUTED PRIMARY ARYL PHOSPHITES AND PHOSPHORODIHALIDITES AND PROCESSES FOR THE MANUFACTURE THEREOF
Francis M. Kujawa, Tonawanda, and Alvin F. Shepard and Bobby F. Dannels, Grand Island, N.Y., assignors to Hooker Chemical Corporation, Niagara Falls, N.Y., a corporation of New York
No Drawing. Filed Aug. 31, 1962, Ser. No. 220,902
12 Claims. (Cl. 260—960)

This invention relates to novel organo-phosphorus compounds and a process for preparing them. More specifically, this invention relates to novel primary aryl phosphites and the process for preparing them.

The primary aryl phosphites of this invention have the general formula:

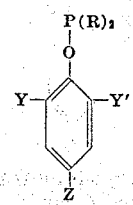

wherein R is selected from the group consisting hydroxyl and halogen radicals; Y and Y' are organic radicals containing at least four carbon atoms, and Z is selected from the group consisting of hydrogen, a halogen, and an organic radical.

The primary aryl phosphites of this invention may be used as stabilizers, plasticizers, gasoline or lubricating oil additives, flame-retarding agents and the like.

Primary aryl phosphite of the art are too unstable to moisture to permit their general usage. Unless products containing them are carefully guarded against moisture, these phosphites hydrolyze yielding phosphorous acid and the parent phenol or phenols. The phosphorous acid set free is usually objectionable because of its tendency to attack metals, the skin, or clothing with which it may come into contact. Free phosphorous acid is also a health hazard, since it decomposes on mild heating to form the highly poisonous gas, phosphine. The phenols liberated on hydrolysis of the phosphites are likewise undesirable because of their unpleasant "carbolic acid" odor and their tendency to discolor on standing.

An object of this invention is to provide a novel organo-phosphorus compound.

A further object of this invention is to provide stable primary aryl phosphite.

A still further object of this invention is to provide a process of preparing stable primary aryl phosphites.

These and other objects of the invention will become apparent from the following detailed description.

It has been found that by reacting phenols, substituted in at least two of their positions with organic radicals containing at least four carbon atoms, with a phosphorous trihalide, under conditions which facilitate removal of halogen acid, a primary aryl phosphorodihalidite is obtained which is then hydrolyzed to a stable primary aryl phosphite.

The compounds of the invention are preferably prepared by reacting a di- or trisubstituted phenol with a phosphorus trihalide in the presence of a tertiary amine, at room temperature, and preventing the accumulation of halogen acid. Triethylamine facilitates the removal of the halogen acid formed by the reaction, thus, increasing the rate of reaction. Other conditions which facilitate the removal of the halogen acid are:

(1) Use of the sodium salt of the di- and trisubstituted phenol with the phosphorus trihalide;

(2) Use of other tertiary amines such as, pyridine, quinoline or tributyl amine;

(3) Addition of an insoluble basic substance, for example, lime; and (4) Prolonged heating together of the phenol and the halide.

The increase in the rate of reaction can be more readily seen in Table I.

TABLE I.—RATE OF REACTION UTILIZING HALOGEN ACID ACCEPTORS

| Reactants | Time Reacted, Hours | Percent Phenol Reacted |
|---|---|---|
| 2,6-di-t-butylphenol+PCl³ | 10 | <7 |
| 2,6-di-t-butylphenol+PCl³+CaO | 10 | 18 |
| 2,6-di-t-butylphenol+PCl³+diethyl amine | 3 | >95 |

The substituted phenols, or their salts, which may be used in the invention are characterized by the following general formula:

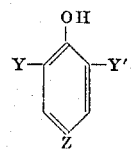

wherein Y and Y' are organic radicals containing at least four carbon atoms and Z is selected from the group consisting of hydrogen, a halogen and an organic radical.

The substituted phenols which may be used in practicing this invention are characterized by the following formulas:

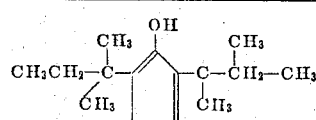

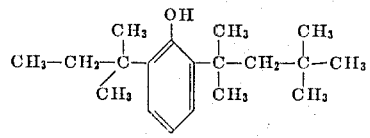

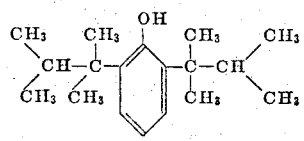

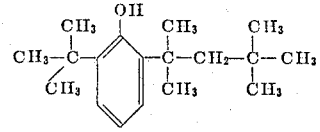

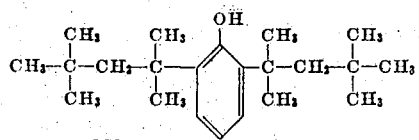

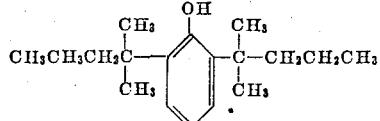

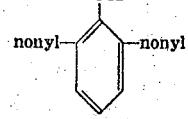

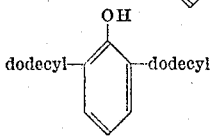

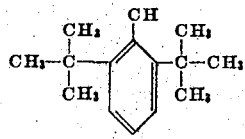

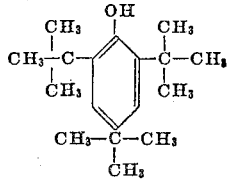

2,4,6-tri-t-butylphenol

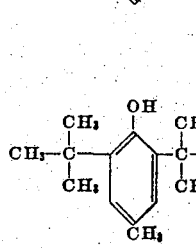

2,6-di-t-butyl-4-methylphenol

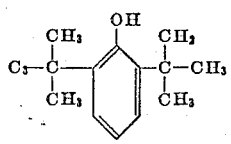

2,6-di-t-butyl-4-nonylphenol

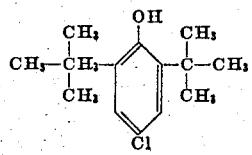

2,6-di-t-butyl-4-chlorophenol

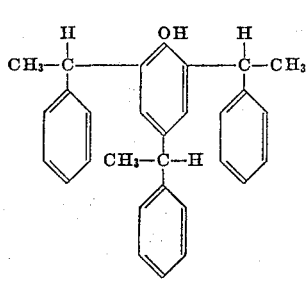

tri(phenylethyl)phenol

It has been found that phenols substituted in the 2,6- and 2,4,5-position give products prepared by the process set forth herein of high stability to hydrolysis. The products of the 2,4,6-tri substituted phenols are more stable than the products of the 2,6-disubstituted phenols.

The temperature and pressure at which the reaction of this invention are carried out are dictated largely by convenience and depend upon the boiling point of the phosphorus trihalide used. Thus, the boiling point of phosphorus trichloride is 76 degrees centigrade and to react this composition much above 76 degrees centigrade would require pressure equipment. However, sub-atmospheric and super-atmospheric pressures can be used if desired.

The reaction is controlled as to the phosphite obtained by the ratio of reactants used. Thus, it is preferred to use a molar excess of phosphorus trihalide or at least about one mole of phosphorus trihalide per mole of substituted phenol.

The phosphorus trihalide may be phosphorus trichloride, phosphorus triiodide, phosphorus tribromide and phosphorus trifluoride. It is preferred for purposes of this invention to use phosphorus trichloride.

The reaction is completed when, in the presence of the tertiary amine, a precipitate no longer continues to form. Another way to test for completion of the reaction is to analyze for the halide and determine that the evolution of halogen acid is complete.

In the process as described herein, phosphorodichloridites are formed as intermediates. These can be hydrolyzed to their corresponding primary phosphites or they may be recovered as such.

It has been found that the 2,4,6-trisubstituted alkyl phenols produce primary aryl phosphites which possess greater stability than the 2,6-disubstituted primary aryl phosphites, although the primary aryl phosphites of this invention do not readily hydrolyze as illustrated in Table II. Triphenyl phosphite and trilauryl phosphite were used as standards. This was done because the unsubstituted primary phosphites such as $C_6H_5OP(OH)_2$ are so difficult to isolate and keep, and it is justified by the fact that $C_6H_5OP(OH)_2$ must be an intermediate in the hydrolysis of triphenyl phosphite. Thus it is apparent that a comparison with $C_6H_5OP(OH)_2$ would have shown the primary phosphites of the present invention to even greater advantage. In all cases, degree of hydrolysis to $H_3PO_3$ was measured, the test samples being refluxed with the aqueous reagent for the time indicated and $H_3PO_3$ being measured by titration of the hydrolysis products for the weakly acid second H of $H_3PO_3$.

TABLE II

| Compound | Time for 50% Hydrolysis to H₃PO₃ | | |
|---|---|---|---|
| | H₂O | 0.05 N NaOH | 0.05 N HCl |
| Triphenyl Phosphite | 50 min | 50 min | |
| Trilauryl Phosphite | 110 min | | |
| 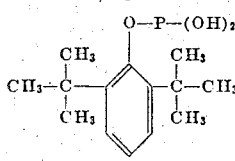 | 180 min | 120 min | |
| 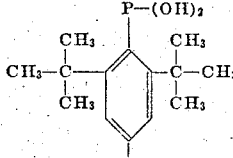 | 0%, 41 hrs | 0%, 50 hrs | 48%, 22 hrs. |
| 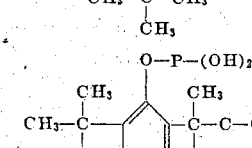 | 32%, 24 hrs | 28%, 60 hrs | 36%, 2 hrs. |
| 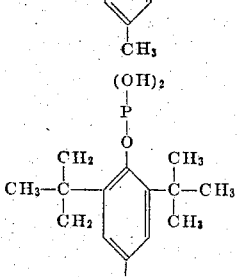 | 25%, 8 hrs | | |

The following examples are presented to illustrate the invention more fully without any intent to limit the invention thereby.

*Example 1.—Preparation of 2,6,-di-t-butylphenylphosphorodichloridite*

A mixture of 500 ml. PCl₃ and 228 g. dry sodium salt of 2,6-di-t-butylphenol was refluxed at about 80° centigrade for about one day. On filtering off precipitated NaCl and distilling the remaining liquid in vacuum through a short column, 2,6-di-t-butylphenylphosphorodichloridite was obtained as a pale yellow liquid. The liquid contained C, 54.78, 54.66%; H, 6.63, 6.36%; P, 9.99%; Cl, 23.36%. Calc. for the phosphorodichloridite (C₆H₃(C₄H₉)₂OPCl₂): C, 54.73%; H, 6.89%; P, 10.08%; Cl, 23.09%.

*Example 2.—Preparation of 2,6-di-t-butylphenylphosphorodichloridite*

A mixture of 413 g. of 2,6-di-t-butylphenol (2.0 m.), and 273.2 g. triethylamine (2.4 m.) was added dropwise at 10° centigrade to 1000 g. PCl₃ over a three hour period. After standing overnight at room temperature, the solids were filtered off and washed with petroleum ether. After stripping off the solvent, unreacted PCl₃ and amine, the crude product 2,6-di-t-butylphosphorodichloridite, was distilled through a short column. The product weighed 184 g. and boiled at 143–146° centigrade/1 mm.

*Example 3.—Preparation of 2,6-di-t-butylphenylphosphite*

To 50 cc. of water, there was added 8.8 g. of 2,6-di-t-butylphenylphosphorodichloridite. After stirring at room temperature overnight, the white solid 2,6-di-t-butylphenylphosphite that formed was filtered off. After recrystallization from hexane, it melted at 136.5–138° centigrade.

Analysis: C, 62.2%; H, 8.7%; P, 11.6%; Cl, 0%. Calc.: C, 62.0%; H, 8.5%; P, 11.4%; Cl, 0%.

*Example 4.—Preparation of 2,4,6-tri-t-butylphenylphosphorodichloridite*

To a mixture of 463 g. of PCl₃ and 121.4 g. of triethylamine there was slowly added 265 g. of 2,4,6-tri-t-butylphenol at 10° C. The reactor was maintained under a small positive N₂ pressure in order to exclude atmospheric moisture. The mixture was then heated at reflux (105° C.) for 6 hours. The solid amine hydrochloride was filtered off and thoroughly washed with petroleum ether. The combined wash and filtrate was distilled and a fraction boiling at 119–124° C./0.4–0.5 mm., was collected. It solidified upon cooling to a colorless crystalline solid 2,4,6-tri-t-butylphenylphosphorodichloridite. This amounted to 313 g. (85% of theory). It solidified upon cooling to a colorless crystalline solid melting at 79–83° centigrade. It contained 18.8% Cl; the calculated value for C₁₈H₂₉OPCl₂ is 19.5% Cl.

This phosphorodichloridite was ground up and slurried with 4 l. of water for 2 hours. The resulting solid was washed with water and then dried. After recrystallization from dimethoxyethane, it melted with decomposition at 185° centigrade. It formed a monosodium salt that is approximately 20 weight percent soluble in H₂O at 20° centigrade. It had the following analysis: C, 67.1%; H, 9.8%; P, 9.7%. Calculated for C₁₈H₃₁O₃P: C, 66.3%; H, 9.5%; P, 9.5%.

Example 5.—Preparation of 2,4,6-tri-t-butylphenyl-phosphite

A mixture of 3787 g. of $PCl_3$ and 833 g. of triethylamine was charged to a pot reactor from which moisture was excluded. A total of 1875 g. of 2,4,6-tri-t-butylphenol was added in small increments over a two hour period at 7–15° centigrade. The reaction mixture was then refluxed for 5.5 hours. The solid amine hydrochloride was then filtered off and washed with petroleum ether. The wash and filtrate were combined and the solvent and unreacted $PCl_3$ and amine were stripped off. The residue was hydrolyzed by treatment with a large volume of water. The resulting solid was washed with water and then with n-hexane. Upon drying, 1976 g. of primary phosphite was obtained that, without further treatment, had a titer indicating 99.9 percent purity.

Example 6.—Preparation of 2,6-di-t-butyl-4-methylphenylphosphite and 2,6-di-t-butyl-4-methylphenylphosphorodichloridite A solution of 124 g. of 2,6-di-t-butyl-4-methylphenol in 121 g. of triethylamine was slowly added to 438 g. of $PCl_3$ at 17 to 19° centigrade. An additional 106 g. of the phenol was then slowly added as a solid. After standing overnight, the mixture was heated at 97 to 110° centigrade, for 3.5 hours. The resulting amine hydrochloride was filtered off and washed with petroleum ether. The combined wash and filtrate was washed with petroleum ether. The combined wash and filtrate was distilled. The fraction boiling at 117 to 120° centigrade/0.5 mm. amounted to 261 g. and solidified upon cooling. It contained 2,6-di-t-butyl-4-methylphenylphosphorodichloridite. This phosphorodichloridite was hydrolyzed in dilute $NaHCO_3$ solution and 2,6-di-t-butyl-4-methylphenylphosphite was obtained. This resulting colorless crystalline solid melted with decomposition at 190–195° centigrade, after crystallizing from acetone. It is a strong monobasic acid having a titer indicating 99.9% purity, and has the following analysis: C, 63.3%; H, 8.84%; P, 10.9%. Calculated for $C_{15}H_{25}O_3P$: C, 63.4%; H, 8.8%; P, 10.9%.

Example 7.—Preparation of 2,6-di-t-butyl-4-nonylphenylphosphite and 2,6-di-t-butyl-4-nonyl-phenylphosphorodichloridite In a manner similar to that of Example 6, a solution of 49.3 g. of 2,6-di-t-butyl-4-nonylphenol in 19.2 g. of triethylamine was reacted with 254 g. of $PCl_3$. The reaction was complete at room temperature; therefore, the heating period was eliminated. Upon distillation 24 g. of the phosphorodichloridite was obtained, B.P. .25 mm. 148–154° centigrade, 16.5% Cl, 7.03% P (calc.: 16.4% Cl, 7.16% P).

Hydrolysis of this product yielded the primary phosphite as a viscous oil. Dilute aqueous solutions of the sodium salt of this material had outstanding surface active properties.

Example 8.—Preparation of 2,6-di-t-butyl-4-chlorophenylphosphite

In a manner similar to that of Example 6, a mixture of 72.1 g. of 2,6-di-t-butyl-4-chlorophenol and 38 g. of triethylamine was reacted with 427 g. $PCl_3$. The heating period was 5.5 hours at 78 to 79° centigrade. The phosphorodichloridite boiled at 156 to 166° centigrade/2.6 mm., and weighed 46.7 g. Hydrolysis of this material by treatment with 1 l. of water yielded the primary phosphite which, after crystallization from dimethoxyethane, melted with decomposition at 140 to 142° centigrade. It is a strong monobasic acid with a titer indicating 99.2% purity. It has the following analysis: P, 10.0%; Cl, 11.4% (calc. P, 10.17%; Cl, 11.63%).

Example 9.—Preparation of 2,4,6-triphenylethylphenylphosphite

Using a procedure similar to that of Example 4, a solution of 101 g. of tri(phenylethyl)phenol and 31 g. of triethylamine was reacted with 339 g. of $PCl_3$. After removing the amine hydrochloride and distilling off the solvent and unreacted $PCl_3$ and amine, the residue was dissolved in diethyl ether. This was then treated with a large volume of water and washed with additional water until the wash was chloride ion free. The ether solution was then dried. The primary phosphite was obtained in crude form as a viscous oil, upon evaporation of the ether.

Example 10.—Preparation of 2,6-di-t-butylphenylphosphite Using CaO

This example illustrates the preparation of 2,6-di-t-butylphenylphosphite using CaO as an acid acceptor.

A mixture of 104 g. (0.5 mol) 2,6-di-t-butyl phenol, 214 g. (1.5 mols) $PCl_3$ and 62 g. (1.1 mols) CaO was heated at reflux for ten hours, under a nitrogen atmosphere. After filtering off solids from the product, it was subjected to distillation and gave a fraction B.$_{10}$ 135 to 168°. On treatment with cold water, the primary phosphite of 2,6-di-t-butylphenol was obtained which, after dissolving in aqueous alkali and precipitating with dilute hydrochloric acid, melted at 134.5 to 136.5°.

Example 11.—Preparation of 2,6-di-t-butylphenylphosphite without acid acceptor Example 10 was repeated, omitting the CaO. The amount of HCl liberated was less than half the amount liberated in forming the 2,6-di-t-butylphenylphosphite prepared in Example 10.

The actual yield of the phosphite in this example was 8 gm. (6% of theory).

Example 12.—Preparation of 2,6-t-butylphenyl-diphenylphosphite

To 9.0 g. of 2,6-dibutylphenyldichlorophosphoridite (0.029 m.) was added 5.1 g. (0.054 m.) phenol over a 15 minute period. The temperature was then maintained at 100° C. for one hour. At this point, 82 percent of the calculated amount of HCl had been given off. The reaction mixture was then distilled under reduced pressure. A 3.7 g. fraction boiling at 200–202° was collected.

*Analysis:* 7.85% P. Calc. for 2,6-t-dibutylphenyldiphenylphosphite: 7.37% P.

Other metal halides other than phosphorus trihalides may also be used in the practice of this invention. For example the halides of antimony, arsenic, silicon and boron may be used.

We claim:
1. A compound of the formula:

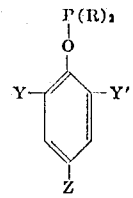

where R is selected from the group consisting of hydroxyl, chlorine and bromine; Y and Y' are selected from the group consisting of tertiary alkyl, having at least four carbon atoms, and phenylethyl radicals; and Z is selected from the group consisting of chlorine, alkyl, having at least four carbon atoms, and phenylethyl radicals.

2. 2,4,6-tri-t-butylphenylphosphorodichloridite.
3. 2,4,6-tri-t-butylphenyl phosphite.
4. 2,6-di-t-butyl-4-nonylphenylphosphite.
5. 2,6-di-t-butyl-4-nonylphenylphosphorodichloridite.
6. 2,6-di-t-butyl-4-chlorophenylphosphite.
7. 2,4,6-triphenylethylphenylphosphite.

8. A process for preparing a primary aryl phosphite having the formula:

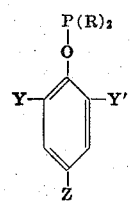

where R is selected from the group consisting of hydroxyl, chlorine and bromine; Y and Y' are selected from the group consisting of tertiary alkyl, having at least four carbon atoms, and phenylethyl radicals; and Z is selected from the group consisting of chlorine, alkyl, having at least four carbon atoms, and phenylethyl radicals; said process comprising reacting a compound having the formula:

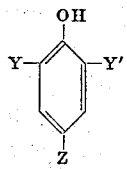

wherein Y, Y' and Z are as defined above, with a phosphorous trihalide, in the presence of an acid acceptor for halogen acid to produce a phosphorohalidite, and, when R is hydroxyl, hydrolyzing the phosphorohalidite, and recovering the corresponding primary aryl phosphite.

9. The process of claim 8 wherein Y, Y' and Z are tertiary butyl groups.

10. The process of claim 8 wherein Y and Y' are tertiary butyl groups and Z is a nonyl group.

11. The process of claim 8 wherein Y and Y' are tertiary butyl groups and Z is a chlorine radical.

12. The process of claim 8 wherein Y, Y' and Z are phenylethyl groups.

References Cited by the Examiner

UNITED STATES PATENTS

| | | | |
|---|---|---|---|
| 2,259,452 | 10/1941 | Berger et al. | 260—461.305 |
| 2,397,702 | 4/1946 | Smith et al. | 260—461.315 |
| 2,441,331 | 5/1948 | Reiff et al. | 260—461.305 |
| 2,732,365 | 1/1956 | Bill et al. | 260—461.315 |
| 2,839,563 | 6/1958 | Hechenbleikner | 260—461.315 |
| 3,014,946 | 12/1961 | Birum | 260—461.305 |
| 3,126,343 | 3/1964 | Wilson | 260—461.315 X |

OTHER REFERENCES

Kosolapoff: "Organo-Phosphorus Compounds" (1950), John Wiley & Sons, Inc., New York, pages 180–187.

CHARLES B. PARKER, *Primary Examiner.*

FRANK M. SIKORA, DELBERT R. PHILLIPS,
*Assistant Examiners.*